United States Patent
Schumacher

(10) Patent No.: US 7,034,524 B2
(45) Date of Patent: Apr. 25, 2006

(54) MEASURING DEVICE FOR THE ANGLE OF ROTATION OF A ROTATING MACHINE MEMBER

(75) Inventor: Heiko Schumacher, Bad Oldesloe (DE)

(73) Assignee: Dichtungstechnik G. Bruss GmbH & Co. KG, Hamburg (DE)

( * ) Notice: Subject to any disclaimer, the term of this patent is extended or adjusted under 35 U.S.C. 154(b) by 0 days.

(21) Appl. No.: 10/426,682

(22) Filed: May 1, 2003

(65) Prior Publication Data

US 2004/0040392 A1    Mar. 4, 2004

(30) Foreign Application Priority Data

May 2, 2002    (DE)    ................................. 10219807

(51) Int. Cl.
*G01B 7/14* (2006.01)
*G01B 7/30* (2006.01)

(52) U.S. Cl. .............................. 324/207.22; 324/207.25

(58) Field of Classification Search ............ 324/207.2, 324/207.21, 207.22, 207.25, 207.26, 207.24, 324/174; 73/862.331; 148/101; 335/296–297
See application file for complete search history.

(56) References Cited

U.S. PATENT DOCUMENTS

| 5,315,198 | A | * | 5/1994 | Toroh | ........................ | 310/162 |
| 5,407,213 | A | * | 4/1995 | Ouchi et al. | ................. | 277/317 |
| 5,978,161 | A | * | 11/1999 | Lemke | ........................ | 359/824 |
| 6,215,299 | B1 | * | 4/2001 | Reynolds et al. | ......... | 324/207.2 |
| 6,417,662 | B1 | * | 7/2002 | Wallrafen | ................... | 324/174 |
| 6,433,536 | B1 | * | 8/2002 | Yundt et al. | ........... | 324/207.22 |
| 6,753,681 | B1 | * | 6/2004 | Enomoto et al. | ...... | 324/207.25 |
| 2002/0078549 | A1 | * | 6/2002 | Yamaguchi | .............. | 29/603.01 |
| 2003/0052669 | A1 | * | 3/2003 | Enomoto et al. | ...... | 324/207.25 |

FOREIGN PATENT DOCUMENTS

DE    197 58 037 A1 *    7/1998

OTHER PUBLICATIONS

Translation of DE 19758037 A1.*

* cited by examiner

*Primary Examiner*—Bot Ledynh
*Assistant Examiner*—David M Schindler
(74) *Attorney, Agent, or Firm*—Duane Morris LLP

(57) ABSTRACT

A device for measuring the angle of rotation of a rotating member of a machine, comprising a signal transmitting rotor which includes a magnet rim consisting of magnets having alternatingly arranged south poles and north poles and being moved with respect to a stationary measuring sensor is characterized in that each magnet or each magnet zone has a thickness which varies substantially sinusoidally in circumferential direction, having its maximum in the pole center of each magnet and/or forms an air gap with the measuring sensor varying sinusoidally in circumferential direction.

12 Claims, 3 Drawing Sheets

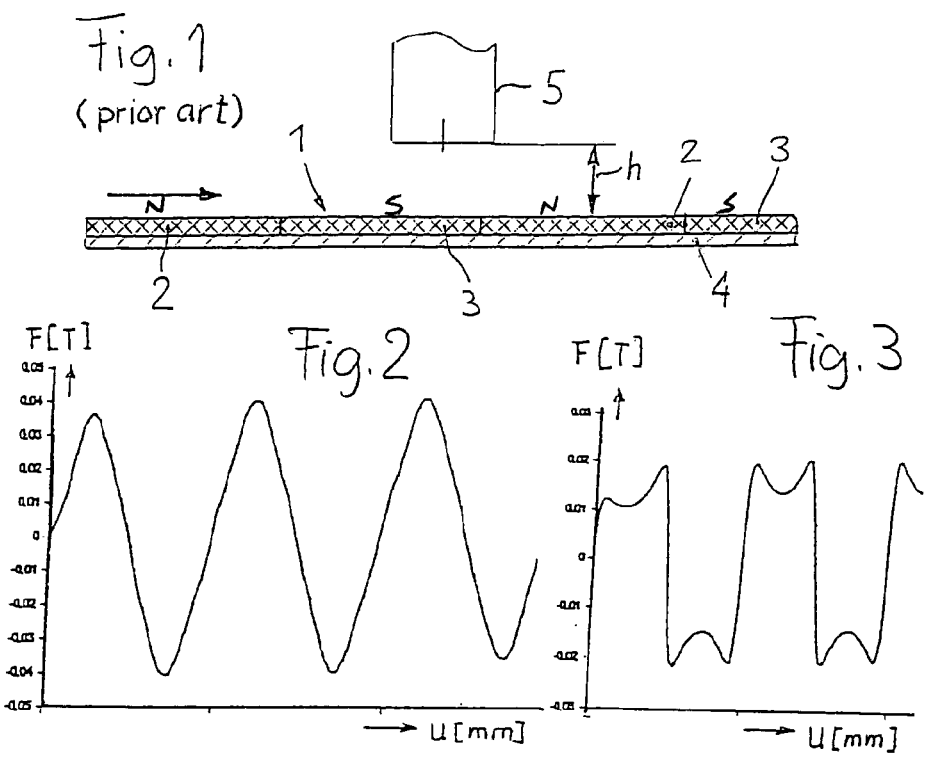
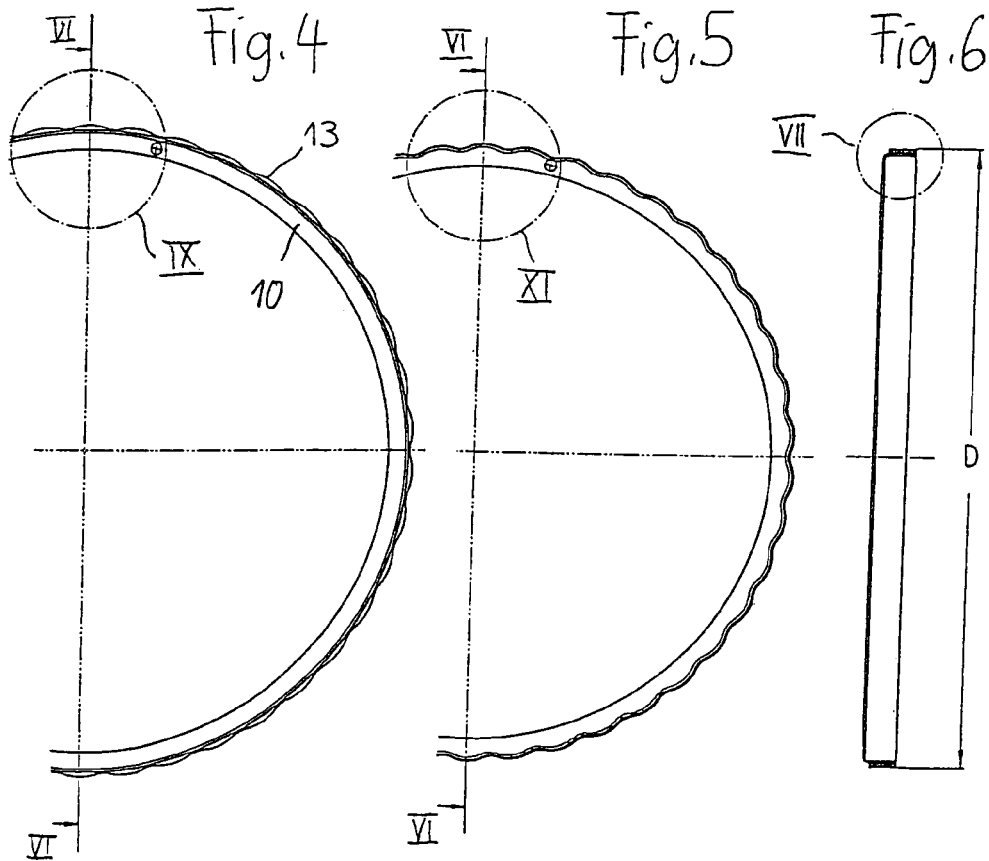

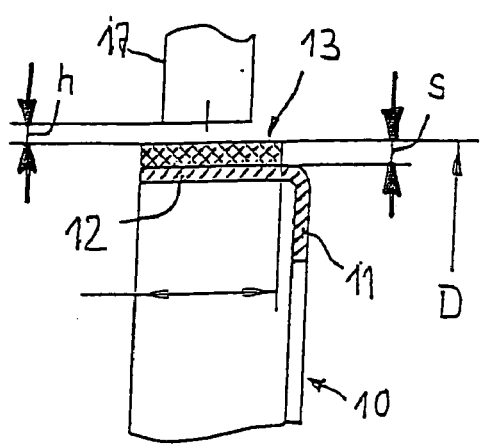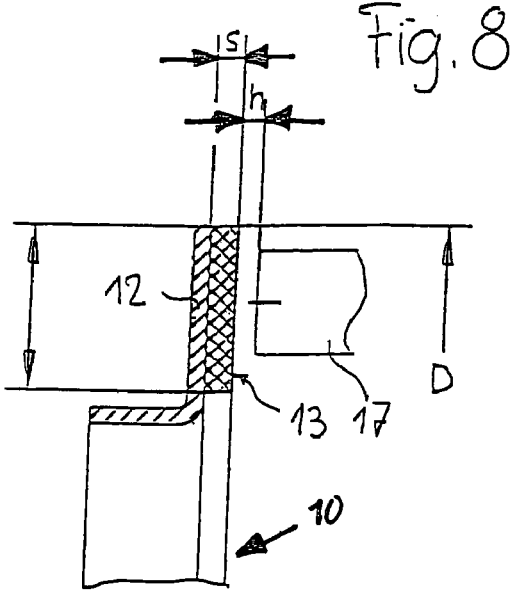

MEASURING DEVICE FOR THE ANGLE OF ROTATION OF A ROTATING MACHINE MEMBER

The invention relates to a device for measuring the angle of rotation of a rotating member of a machine, comprising the features recited in the preamble, briefly referred to in the art as "multipole wheel".

DE 197 58 037 A1 discloses such a multipole wheel having a magnet rim in the form of a ring made of an elastomeric material, including magnetizable particles, and having alternatingly arranged north and south poles. This ring is undetachably connected to a support ring. FIG. 1 is a developed view of a part section illustrating such a multipole wheel 1 which comprises a magnet rim fixed to a support ring 4 and consisting of a series of adjacent magnets 2, 3 with alternating polarities oriented in opposite directions. Reference numeral 5 designates a measuring sensor which is stationary in relation to the movable multipole wheel 1, being located at a predetermined distance h from the surface of the magnet rim 2, 3.

Multipole wheels of the kind described serve to emit a plurality of signals per revolution, the number of signals being determined by the number of magnet poles and the respective application, such as detecting the number of revolutions for an ABS (anti-lock system) function of motor vehicle brakes and the like. Furthermore, structural data, such as the dimensions (diameter) of the signal transmitting rotor or multipole wheel respectively likewise are predetermined. No matter what the particular application, it is always desirable to obtain a sinusoidal ideal course of the signals detected by the measuring sensor and transmitted to evaluation electronics for the magnetic flux F over the circumference U of the measured value transmitting wheel, as illustrated in the diagram of FIG. 2.

Periodic irregularities in the course of the magnetic flux, such as illustrated in FIG. 3, can happen in practice, particularly so if the number of magnet poles distributed around the circumference is small and consequently the pole length is great. Instead of a sinusoidal course of the magnetic flux F over the circumference of the multipole wheel, flat stretches or even saddle-shaped buckling, each with a double reversal of the magnetic flux curve, will appear in the area of maximum and minimum flux densities. When curves take such courses, undesired switching states may be triggered, resulting in malfunction.

It is an object of the invention to provide a device of the kind specified initially such that the occurrence of periodic discontinuities at detection of the flux densities by the measuring sensor is avoided, especially so if the pole length of the magnet rim referred to the circumference of the signal transmitting rotor or multiple wheel, respectively, becomes large due to requirements of use and dimensioning.

This object is met by the features recited in the claims. According to these features each magnet has a thickness which varies substantially sinusoidally along the length of the magnet in a circumferential direction, having its maximum at the pole center of each magnet, and/or each magnet and the measuring sensor include between them an air gap which varies sinusoidally in a circumferential direction.

Advantageous modifications of the invention are recited in the dependent claims.

With the device according to the invention, a steady sinusoidal course, as shown in FIG. 2, of the magnetic flux F over the circumference U of the multipole wheel is achieved even when the predetermined pole number is small or the pole length great due to the particular use or structural conditions. In other words, courses of curves of the magnetic flux F such as shown in FIG. 3 which are unsuitable for use, are avoided.

The invention will be described further, by way of example, with reference to the accompanying drawings, in which:

FIG. 1 is a diagrammatic presentation of a known device for measuring the angle of rotation of a rotating machine member;

FIG. 2 shows an ideal sinusoidal course, as aimed at by the invention, of the magnetic flux over the circumference of a multipole wheel according to the invention;

FIG. 3 shows an unsuitable course of a curve obtained when the pole length is great, as with the known device shown in FIG. 1;

FIGS. 4 and 5 are partial views of two different embodiments of a multipole wheel according to the invention;

FIG. 6 is a sectional elevation along line VI—VI in FIGS. 4 and 5, respectively;

FIG. 7 shows the detail of mark VII in FIG. 6 on an enlarged scale;

FIG. 8 is a presentation similar to FIG. 7 showing a detail of a modified embodiment of a multipole wheel according to the invention;

For the sake of simplicity, like reference numerals are used in the drawings of the various embodiments to designate like parts and those having like effects.

Figure 9:
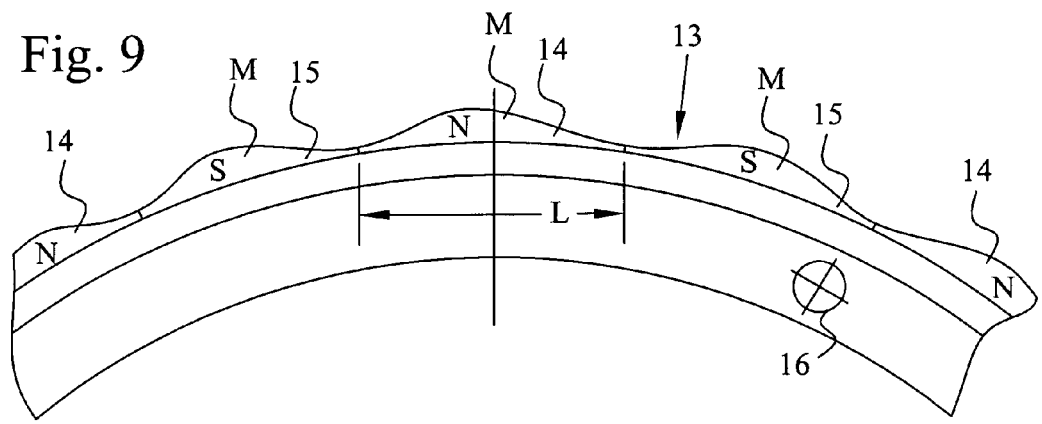
FIG. 9 shows the detail of mark IX in FIG. 4 on an enlarged scale.

A multipole wheel as illustrated in FIGS. 4, 6, 7 and 9 comprises a support ring 10 having a radial flange 11 and axial flange 12 bent at right angles from the radial flange. A magnet rim, generally designated 13, is undetachably fastened to the flange 12. The magnet rim 13 comprises contiguous magnets or magnet zones 14, 15 of alternatingly opposite polarities N an S. A reference mark 16 in the form of a bore is provided at a predetermined angular position of the support ring 10 to make sure that when manufacturing the multipole wheel the support ring 10 can be placed in a magnetizing means only in such a position that locations of maximum signal intensity always will come to lie at the center M of the magnets 14, 15. In the embodiment shown in FIG. 9, the magnet poles 14, 15 have a thickness which varies substantially sinusoidally along the length of the magnet, with the maximum s of the thickness to be found at the pole center M. The magnets 14, 15 are bonded in contiguous relationship on the constant diameter D-s outer periphery of the axial flange 12 of the support ring 10. The magnets may be pressformed in per se known manner from sintered metallic material. But the magnet rim of magnets 14, 15 also may be made of an elastomeric rubber strip containing magnetizable particles which then is magnetized in per se known manner with alternatingly opposite polarities N and S in accordance with the desired number of magnet poles.

A measuring sensor 17 which is stationary with respect to the multipole rotor described above, is shown only in FIG. 7. This measure sensor 17 is arranged spaced from the multipole wheel rotating past it, with a predetermined air gap of width h between them. In the embodiment illustrated, the width h of this air gap varies because of the sinusoidal thickening of the magnet poles 14, 15 of the magnet rim 13, and it does so in opposite sense to the thickness s of the magnet poles. These two effects thus become superimposed in the sense that the measuring sensor 17 will emit a measured signal which is twice amplified when the air gap h is at its minimum and the magnet pole thickness s is at its maximum.

As the multipole rotor 13 rotates past the measuring sensor 17 the measured signal varies sinusoidally in accordance with the course of the curve shown in FIG. 2, without any irregularities even when the pole lengths L are very great and the number of poles very small as referred to the circumference of the multipole wheel.

Figure 11:
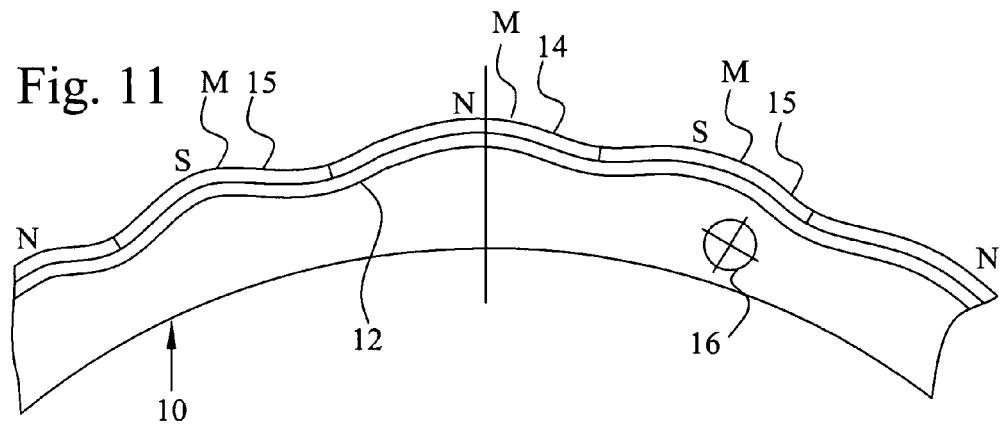
FIG. 11 shows the detail of mark IX in the embodiment according to FIG. 5.

With reference to FIGS. 5 and 11, the metal support ring 10, which again is angle-shaped, has an axial flange 12 which is undulated in sinusoidal confignration, and the magnet rim 13 bonded to the same has a constant thickness s. In this case signal amplification is obtained at respective pole center positions exclusively due to the narrowing of the air gap h. This may make sense for reasons of application or manufacture.

Figure 10:
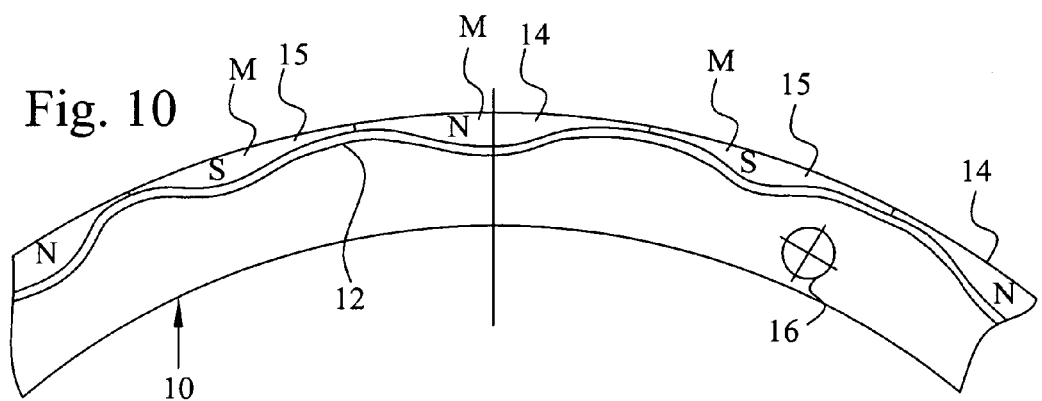
FIG. 10 is a presentation similar to FIG. 9 showing another embodiment of the invention.

In the embodiment according to FIG. 10, too, the axial flange 12 of the support ring 10 is sinusoidally undulated circumferentially. Here, however, the magnet rim 13 likewise has thickened portions with maximum values at the respective pole centers M, as is the case with the embodiment of FIG. 9. But here the thickenings are oriented radially inwards so as to fill the wave troughs of the flange 12 of the support ring. As a result the outer diameter of the multipole wheel shown in FIG. 10 is constant. The signal amplification effect at pole centers in principle is the same as with the embodiment of FIG. 9, i.e. it is twofold.

The variant illustrated in FIG. 8 differs from the embodiments described above only in that the flange 12 of the angle-shaped support ring 10 is directed radially and the magnet rim 13 is bonded to the flat, radial end surface of the flange 12. Thus the flange 12 is positioned opposite the measuring sensor 17 which in this case is disposed axially with respect to the magnet rim 13.

Also with this variant, the magnet rim 13 has a thickness which varies substantially sinusoidally, having its maximum at the pole center M of each pole, and/or a sinusoidally varying air gap h exists between the magnet rim 13 and the measuring sensor 17, having its minimum values at the respective pole centers M, in a manner similar to FIGS. 9 to 11.

The features disclosed in the specification above, in the drawings and claims may be essential to realizing the invention in its various modifications, both individually and in any combination.

What is claimed is:

1. A device for measuring the angle of rotation of a rotating member of a machine, comprising a signal transmitting rotor which includes a magnet rim consisting of magnets having alternatingly arranged south poles and north poles and being moved with respect to a stationary measuring sensor, characterized in that each magnet has a thickness which varies substantially sinusoidally in a circumferential direction, and where each magnet has its maximum thickness at its pole center, wherein the magnet rim is mounted on a peripheral surface of a support ring of the signal transmitting rotor, and that the measuring sensor is disposed radially with respect to the magnet rim, wherein the magnet rim is adhered to a substantially sinusoidally undulated peripheral surface of the support ring, and that the variation in thickness of the magnets is achieved by bulging of the magnets into a plurality of wave troughs formed by the undulated peripheral surface of the support ring.

2. The device as claimed in claim 1, characterized in that the magnet rim is embodied by an elastomer strip containing magnetizable particles and comprises a series of successive magnet zones obtained by magnetization of the elastomer strip with alternating polarities.

3. The device as claimed in claim 1, wherein an air gap (h) between the magnets and the measuring sensor lies in the range of $0.5 < h \leq 10$ mm.

4. The device as claimed in claim 3 wherein the air gap (h) between the magnets and the measuring sensor lies in the range of $1 < h \leq 3$ mm.

5. The device as claimed in claim 1, wherein a maximum thickness (s) of the magnets lies in the range of $0.5 < s \leq 10$ mm.

6. The device as claimed in claim 5 wherein the maximum thickness (s) of the magnets lies in the range of $1 < s \leq 3$ mm.

7. A device for measuring the angle of rotation of a rotating member of a machine, comprising
a signal transmitting rotor which includes a magnet rim consisting of magnets having alternatingly arranged south poles and north poles and being moved with respect to a stationary measuring sensor, characterized in that an air gap sinusoidally varying in a circumferential direction is formed between each magnet and the measuring sensor, wherein the magnets have a constant thickness and are adhered to a substantially sinusoidally undulated peripheral surface of a support ring, and that the measuring sensor is disposed radially with respect to the magnet rim.

8. The device as claimed in claim 7, characterized in that the air gap (h) between the magnets and the measuring sensor lies in the range of $0.5 < h \leq 10$ mm.

9. The device as claimed in claim 8 wherein the air gap (h) between the magnets and the measuring sensor lies in the range of $1 < h \leq 3$ mm.

10. The device as claimed in claim 7, characterized in that the maximum thickness (s) of the magnets lies in the range of $0.5 < s \leq 10$ mm.

11. The device as claimed in claim 10 wherein the maximum thickness (s) of the magnets lies in the range of $1 < s \leq 3$ mm.

12. The device as claimed in claim 7, characterized in that a location of a minimum air gap (h) always occurs at the pole center of the magnets.

* * * * *